United States Patent [19]

Bartscher et al.

[11] Patent Number: 5,181,418
[45] Date of Patent: Jan. 26, 1993

[54] DEVICE FOR MONITORING THE PRESSURE OF A MEASUREMENT CHAMBER CHARGED WITH THE PRESSURE OF A VEHICLE TIRE

[75] Inventors: Peter Bartscher; Günther Singbartl, both of Hanover; Erwin Petersen, Wunstorf; Helmut Ulrich, Springe, all of Fed. Rep. of Germany

[73] Assignee: WABCO Westinghouse Fahrzeugbremsen GmbH, Hanover, Fed. Rep. of Germany

[21] Appl. No.: 657,500

[22] Filed: Feb. 19, 1991

[30] Foreign Application Priority Data

Feb. 24, 1990 [DE] Fed. Rep. of Germany ....... 4005897

[51] Int. Cl.⁵ .................. B60C 23/02; G01L 7/16
[52] U.S. Cl. .................. 73/146.3; 73/146.4; 73/146.5; 73/744; 116/34 R
[58] Field of Search ............... 73/146.3, 146.4, 146.5, 73/146.8, 705, 744, 745; 137/227, 228, 229; 116/34 R

[56] References Cited

U.S. PATENT DOCUMENTS

| | | | |
|---|---|---|---|
| 3,738,308 | 6/1973 | Barabino | 73/146.8 |
| 4,103,282 | 7/1978 | Cook | 73/146.8 |
| 4,363,020 | 12/1982 | Venema | 73/146.5 |
| 4,384,543 | 5/1983 | Wong | 73/146.8 |

*Primary Examiner*—Donald O. Wood
*Attorney, Agent, or Firm*—Horst M. Kasper

[57] ABSTRACT

The invention device monitors the pressure of a measurement chamber subjected to the pressure prevailing in a vehicle tire. A pressure-sensitive device scans the tire pressure with a pressure measurement member in a measurement chamber. In case of a tire-pressure drop, the tire pressure is used to actuate an auxiliary actuator (3, 24, 26). The auxiliary actuator genrates the regulating distance (s) dependent on a tire pressure drop below a pressure value required for an actuation of the actuator (13). The regulating distance (s) is recognizable by a sensor. The invention device is suitable for providing a permanent signal even in case of an absence of pressure in the measurement chamber (21).

32 Claims, 2 Drawing Sheets

DEVICE FOR MONITORING THE PRESSURE OF A MEASUREMENT CHAMBER CHARGED WITH THE PRESSURE OF A VEHICLE TIRE

BACKGROUND OF THE INVENTION

1. Field of the Invention

The invention relates to a device for monitoring the pressure of a motor vehicle tire, where an actuator is employed for generating a regulating distance indicating a pressure drop in a measurement chamber.

2. Brief Description of the Background of the Invention Including Prior Art

Such a device is known from the German Patent DE-PS 2,813,058-C2. The device of the German Patent scans the tire pressure with a pressure-sensitive device, disposed at the vehicle wheel. Upon falling below specified tire pressure, the device actuates with this pressure sensitive device an actuator such that the actuator generates a regulating distance. An axially fixedly disposed sensor scans the position of the actuator and thereby recognizes a tire pressure, which is disposed below a preset or specified tire pressure. A corresponding information of the sensor can be fed via an evaluation circuit to a display unit, which is disposed, for example, in the driver's cab.

In case the tire pressure is equal to or higher than the specified tire pressure, corresponding to the constructive features of the pressure-sensitive device, no tire pressure is present at the actuator. Consequently, the actuator, subjected to the restoring force, is in an initial position, which is not associated with the display signal or, respectively, the sensor recognizes that the available tire pressure has not fallen below the specified set tire set pressure.

However, the actuator can also assume the above-recited non-indicating initial position if the tire pressure exerted onto the actuator has assumed such a low value, based on a marked drop in the tire pressure, that the restoring force directed opposite to the tire pressure prevails. The device of the German Patent is therefore associated with the disadvantage that the tire pressure monitoring is reliable only up to a certain minimum tire pressure, where the level of the minimum tire pressure is essentially determined by the restoring force directed to the actuator.

The German Patent DE-3,422,725-C2 to Rainer Achterholt teaches a valve cap with a pressure-decrease display for air tires. While the reference device is intended to indicate pressure changes in a tire, it does not provide a signal for a remote display of the pressure situation in a tire.

The German Patent Application Laid Open DE-OS 3,030,794-A1 to Philip Hugh Pegram teaches an air-loss warning device for an air tire. This reference teaches a view signal based on a pressure loss, however, no signal for a remote display is furnished by the reference structure.

The German Printed Patent Publication DE-OS 1,680,495 to Giacomo Spaggiari teaches a display device for pressure decreases in vehicle tires, in particular for motor vehicles. While the reference provides an indicator structure, this indicator structure is indirectly associated with the device and a remote display does not appear to be part of this structure.

The German Petit Patent G-8,206,932.8 to Wolfgang Lubs teaches a monitor for a filling volume. No possibility is given by this reference for a remote display of the indicated signal.

The German Printed Patent 820,545 to Josef Reiter et al. teaches a tire-pressure control device for air tires for tractors and their trailers. The reference aims at providing a display at a dashboard of the driver cabin. A strictly mechanical structure is taught in the reference, which appears quite unwieldy and impractical as described in the reference.

SUMMARY OF THE INVENTION

Purposes of the Invention

It is an object of the present invention to improve a monitoring device for a vehicle tire such that a tire pressure, dropping below the set point pressure, generates a continuing indicator signal even where a tire is completely emptied or, respectively, a measurement pressure, corresponding to the tire pressure, is eliminated at the pressure-sensitive device in contrast to the operational deficiencies of the device taught in the German Patent No. 2,813,058-C2.

It is a further object of the present invention to provide a tire pressure safety indicator which operates with simple mechanical means.

It is yet a further object of the present invention to furnish a system for a tire pressure monitoring which functions reliably independent of the temperature present.

These and other objects and advantages of the present invention will become evident from the description which follows.

BRIEF DESCRIPTION OF THE INVENTION

The invention is associated with the advantage that even an interruption of the connection between the tire and the pressure-sensitive device, which could be caused for example by a defective assembly and mounting, or, by destruction during vehicle operation, remains indicated by the signal until such an undesired state is eliminated.

The invention device is further associated with the advantage that this display can be recognized by a signal in case of an operating and switched-on, or a non-operating and switched-off electrical, or electronic part of the tire pressure monitoring device.

The invention device is associated with the further advantage that, during the filling of an emptied tire, the vehicle operator can recognize the reaching of the specified and set tire pressure as well as the operational functioning of the pressure-sensitive device for the tire monitoring.

The instant invention provides for a device for monitoring the pressure of a measurement chamber subjected to the pressure of a vehicle tire. A cylindrical valve body forms a valve device and can be controlled dependent on the pressure in the pressure measurement chamber. A piston-shaped extension has a piston face and is coaxially attached to a first axial end of the valve body. The piston-shaped extension is set in motion in case of a pressure drop in the pressure measurement chamber for actuation of the valve device. A transducing extension forms a second axial end of the valve body. The cylindrical valve body, the piston-shaped extension, and the transducing extension together form an auxiliary actuator. A pressure measurement member engages the piston-shaped extension of the auxiliary actuator for an auxiliary generation of a regulating distance and for controlling and actuating the valve device. A pressure measurement chamber is defined by a volume space adjoining a middle section of an outside surface of the valve body, adjoining the piston face of the piston-shaped extension, and disposed such as to subject the piston-shaped extension to the pressure in the measurement chamber. A transducing member is engaged by the transducing extension. The pressure measurement member acts, in case of a pressure drop, mechanically onto the piston-shaped extension. A restoring force member engages the transducer member. An actuator is associated with the transducing member for generating a regulating distance indicating a pressure drop in the measurement chamber. The actuator is actuated by a pressure of the measurement chamber against a force of the restoring force member.

The transducing member can be furnished by an actuator pressed by a restoring force of a spring furnishing the restoring force member.

The transducing member can be furnished by a transfer mechanism actuated by the actuator. The transfer mechanism can be furnished for transferring a control setting distance onto a sensor scanning the control setting distance. The transfer mechanism can be formed by a flexible and bendable linkage of the kind of a Bowden cable.

The actuator can be formed together with the transfer mechanism as a single piece. A regulating distance, generated with the auxiliary actuator, can be mechanically transferred onto the actuator. The mechanical transfer of the regulating distance can be performed from the auxiliary actuator onto the transfer mechanism after the auxiliary actuator makes contact with the actuator.

A first seal can be disposed at a valve casing for engaging the valve body. The auxiliary actuator can include a first section. The first section can be constructed such that it serves as the valve body for the valve device. The valve body with its first section can engage the first seal. A second seal can be disposed at the valve casing. The first section can form together with the second seal an outlet valve. The actuator can be connected to an atmospheric outlet port via the outlet valve for purposes of pressure venting and pressure release. The transducing member can be formed by an actuator connectable to the inlet valve for providing a pressure application to the piston-shaped extension. The force of the pressure measurement member can serve for an actuation of the valve device such that the inlet valve opens and the outlet valve closes in case a pressure in the measurement chamber has a level value below a specified pressure.

A signal-generating device can be furnished with an actuating member. The signal-generating device can be actuated depending on a regulating distance furnished by the actuator or furnished by the auxiliary actuator. A second restoring force member can provide a restoring force against the motion of the actuator upon a pressure drop. The signal generating device can generate an optically perceivable signal for a time duration corresponding to the generated regulating distance. The signal-generating device can be integrated into a valve casing surrounding the pressure-sensitive device. A signal-generating part can be attached to the actuating member formed by a signal pin for penetrating a breakthrough valve casing opening. The signal-generating part of the actuating member can be optically emphasized by a specific coloration. The optically perceivable signal can be generated by a complete or partial covering of a view window coordinated to the signal-generating device.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

In the accompanying drawing, in which are shown several of the various possible embodiments of the present invention.

DESCRIPTION OF INVENTION AND PREFERRED EMBODIMENTS

Figure 1:
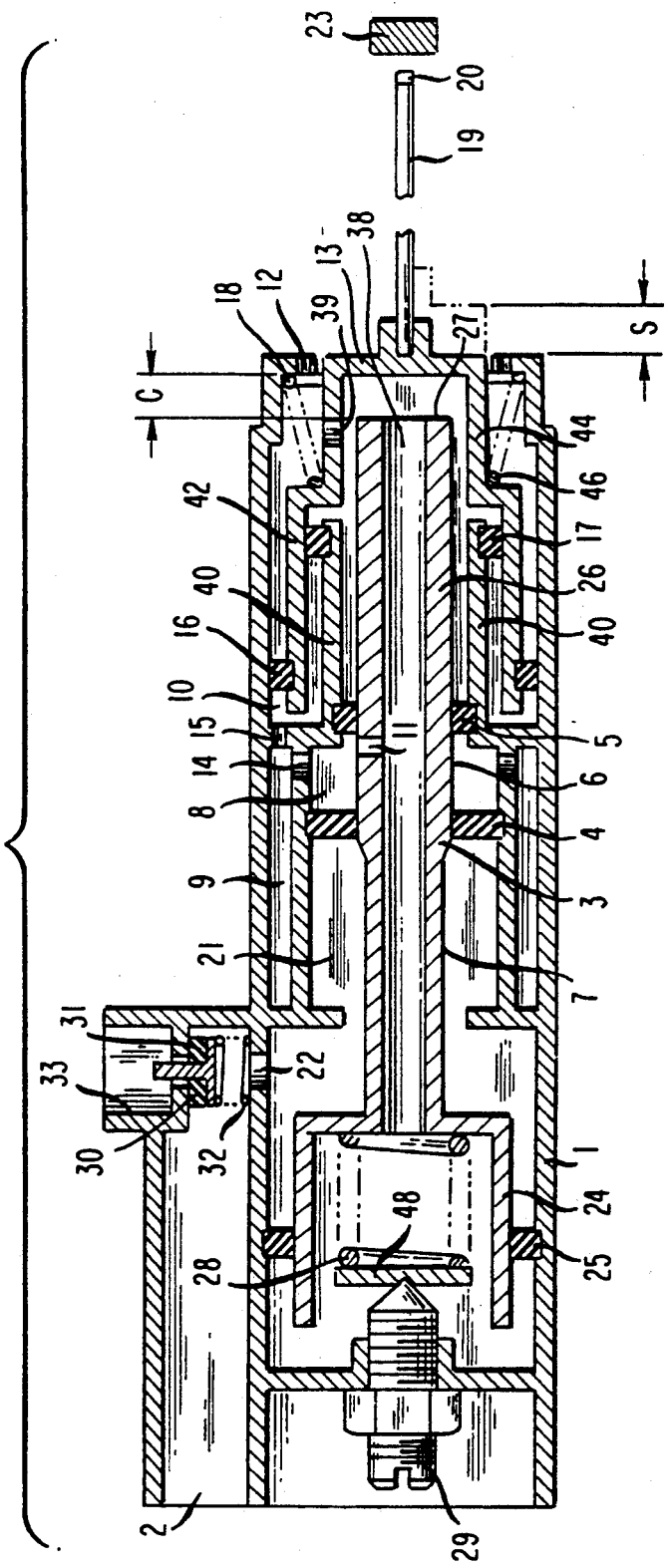
FIG. 1 illustrates a device for monitoring the pressure of a measurement chamber subjected to the pressure of a vehicle tire, disposed at a vehicle wheel.

The invention device indicates a drop in the tire pressure even in case such tire is completely emptied.

The device for monitoring the pressure of a measurement chamber subjected to the pressure of a vehicle tire comprises (a) an actuator for generating a regulating distance indicating a pressure drop in the measurement chamber. The actuator is actuated against a restoring force based on the pressure of the measurement chamber;

(b) a valve device, controllable dependent on the pressure in the measurement chamber. The actuator can be connected to the measurement chamber in case of a pressure drop for actuation of the valve device;

(c) a pressure measurement member for a control and actuation of the valve device. The pressure measurement member is subjected to the pressure in the measurement chamber.

The pressure measurement member 28 is disposed and structured for serving as an auxiliary actuator 3, 24, 26 for an auxiliary generation of a regulating distance s and, in case of a pressure drop, acts mechanically either onto the actuator 13 against the restoring force of the spring 18 or in the same direction on a transfer mechanism 19 actuatable by the actuator 13.

The transfer mechanism 19 can be furnished for transferring the regulating distance s onto a sensor 23 scanning the regulating distance s. The transfer mechanism 19 is formed by a flexible, bendable, and elastic linkage 19 of the kind of a Bowden cable. The actuator 13 can be formed together with the transfer mechanism 19 as a single piece. The regulating distance s, generatable with the auxiliary actuator 3, 24, 26, can be mechanically transferrable onto the actuator 13. The mechanical transfer of the regulating distance s from the auxiliary actuator 3, 24, 26, onto the transfer mechanism 19 can be performed after the auxiliary actuator 3, 24, 26 makes contact with the actuator 13.

The auxiliary actuator 3, 24, 26 can include a section 3. The section 3 can be constructed such that it serves as a valve body 3 for the valve device 3, 4; 3, 5. The section 3 can form together with a seal 4 an inlet valve 3, 4. The actuator 13 can be connected to the measurement chamber 21 with the inlet valve 3, 4 for a pressure application. The section 3 can form together with a seal 5 an outlet valve 3, 5. The actuator 13 can be connected with an atmospheric outlet port 12 via the outlet valve 3, 5, for purposes of pressure venting and pressure release. The force of a pressure measurement member 28 can serve for an actuation of the valve device 3, 4; 3, 5 such that the inlet valve 3, 4 opens and the outlet valve 3, 5 closes in case of a pressure in the measurement chamber having a level value below a specified pressure.

A signal-generating device 34, 35, 36 can be furnished with an actuating member 34. The signal-generating device 34, 35, 36 can be actuated depending on the regulating distance s, generatable by the actuator 13 or by the auxiliary actuator 3, 24, 26, against the force of a restoring spring 35. For example, an optically perceivable signal can be generated with the signal generating device 34, 35, 36 for the time duration of the generated regulating distance s. The signal-generating device 34, 35, 36 can be integrated into a casing surrounding the pressure-sensitive device 1. A signal-generating part 37 of the actuating member 34 can be formed of a signal pin 37 penetrating a breakthrough casing opening 36. The signal-generating part 37 of the actuating member 34 can be optically emphasized by a specific coloration. The optically perceivable signal can be generated by a complete or partial covering of a view window coordinated to the signal-generating device 34, 35, 36.

FIG. 1 illustrates a pressure-sensitive device formed as a valve casing 1, with a pressure inlet port 2. The pressure inlet port 2 is connected to vehicle tire and is subjectable to the tire pressure. A valve body 3, of the kind of a valve slider, forms part of a valve device 3, 4; 3, 5. The valve body 3 forms an inlet valve 3, 4, together with a valve seal 4 and an outlet valve 3, 5, together with the valve seal 5. The valve body 3 includes two different outer diameter sections 6, 7, along the length of the valve body, where the two sections are separated by a step. The larger diameter section 6 forms a free first end and changes over to the smaller diameter section 7 at a second end. The inlet valve 3, 4, is closed in the position of the valve body illustrated in FIG. 1, where the valve seal 4 and the larger diameter section 6 are in direct contact. The pressure chambers 8, 9, 10 are subjectable to the tire pressure via the inlet valve 3, 4 and are connected to each other by way of passage ports 14, 15. The outlet valve 3, 5, is in the open position according to FIG. 1, where pressure chambers 8, 9, 10 are connected via passage port 11 and via a chamber 38 of valve body 3 as well as via a passage port 39 to the atmospheric outlet port 12 of the valve casing 1. The valve body 3 assumes a position based on a longitudinal motion of the valve body 3. In this position, an annular slot for fluid passage is generated between the smaller diameter section 7 and the valve seal 4, i.e. the inlet valve 3, 4, is in an open position. Simultaneously, a closing of the outlet valve 3, 5, is performed by separating the passage port 11 from the pressure chambers 8, 9, 10 by way of the valve seal 5 based on a motion of the valve body to the right relative to the position illustrated in FIG. 1.

The pressure chamber 10 is delimited and covered by a piston-shaped actuator 13 and seals 16, 17 on the side corresponding to the first end of the larger diameter section 6. The seals 16, 17 serve also as guide elements for the actuator 13 during a motion of the actuator 13 in its axial direction. The restoring spring 18 retains the actuator 13 in an initial position. The spring 18 is disposed between an outside shoulder step of the actuator 13 and an inner circular corner edge of the valve casing 1 such that the spring pushes the actuator inwardly of the casing. A transfer mechanism 19, in the kind of linkage 19, is connected to the actuator 13. The linkage 19 can also be formed flexible, bendable, and elastic, in the kind of a Bowden cable.

A signal-generating and/or signal-transducing component 20 is movable together with the linkage 19 relative to a sensor 23. The disposition of the signal-transducing component 20 relative to the sensor 23 is formed such that sensor 23 can register the relative motion of the signal-transducing component 20 and that the sensor 23 can transfer the relative motion into corresponding sensor signals. The component 20 can be disposed, for example, as taught in the German Patent DE-2,813,058-C2, in a gear wheel of an anti-skid braking system for sensing the wheel speed such that a modification of the anti-skid braking signal achieved thereby can be distinguished and recognized as a tire pressure signal.

The pressure chamber 8 bounded by the valve seals 4, 5 can be connected to a measurement chamber 21 via the inlet valve 3, 4. The measurement chamber 21 is connected via a breakthrough opening 22 with the pressure inlet port 2. Thereby, the pressure chamber 8 can be subjected to the tire pressure. The valve body 3 exhibits a piston-shaped extension 24 at that end of the smaller diameter section 7 disposed remote relative to the larger diameter section 6. An outer surface of the piston-shaped extension 24 together with a seal 25 forms a confining boundary surface of the measurement chamber 21. The valve body 3 includes an extension piece 26 near the free end of the larger diameter section 6. The extension piece 26 is formed such that, in case of a closed inlet valve 3, 4, as illustrated in FIG. 1, and in case of a pressureless pressure chamber 10, there is present a clearance distance c between the front face 27 of the extension piece 26 and an inner wall of the actuator 13. The clearance distance c approximately corresponds to the actuating stroke required for an actuation of the valve device 3, 4; 3, 5.

The valve body 3, the piston-shaped extension 24, and the extension piece 26 together form an auxiliary actuator 3, 24, 26. This auxiliary actuator 3, 24, 26, is pretensioned against the tire pressure prevailing in the measurement chamber 21 based on a pressure measurement member 28 formed as a compression spring 28. The force of the pressure measurement member 28, acting on the auxiliary actuator 3, 24, 26, can be set with an adjusting screw 29. The height level of the signal pressure, prevailing in the measurement chamber 21, can be determined by that force of the pressure measurement member 28, which force moves the inlet valve 3, 4 into the open position.

The pressure measurement member 28 can also be combined with a conventional device which allows to compensate temperature-caused tire pressure differences. Such a device for temperature-caused tire pressure differences is for example a reference-pressure box subjected to the tire pressure, as taught in U.S. Pat. No. 4,208,982.

According to the embodiment of FIG. 1, the actuator 13 is connected to the transfer mechanism 19 to form a single piece. Corresponding to the constructive conditions, for example, based on reasons of an easier assembly and a better mounting or an exchangeability of device components, the actuator 13 and the transfer mechanism 19 can also be disposed separately in series. The transfer of the regulating distance s would then be performed by the actuator 13 contacting the transfer mechanism 19.

A conventional tire-pressure filling stud is provided by a corresponding filling port 33. This filling port 33 can be formed with a valve body 30, a valve seat 31, fixedly placed in the casing, as well as a valve spring 32, which retains the valve body 30 on the valve seat 31 and acts as a check valve. The tire-pressure filling stud is integrated in the valve casing 1. The tire-pressure filling stud can also be disposed at a different location of the wheel.

Figure 2:
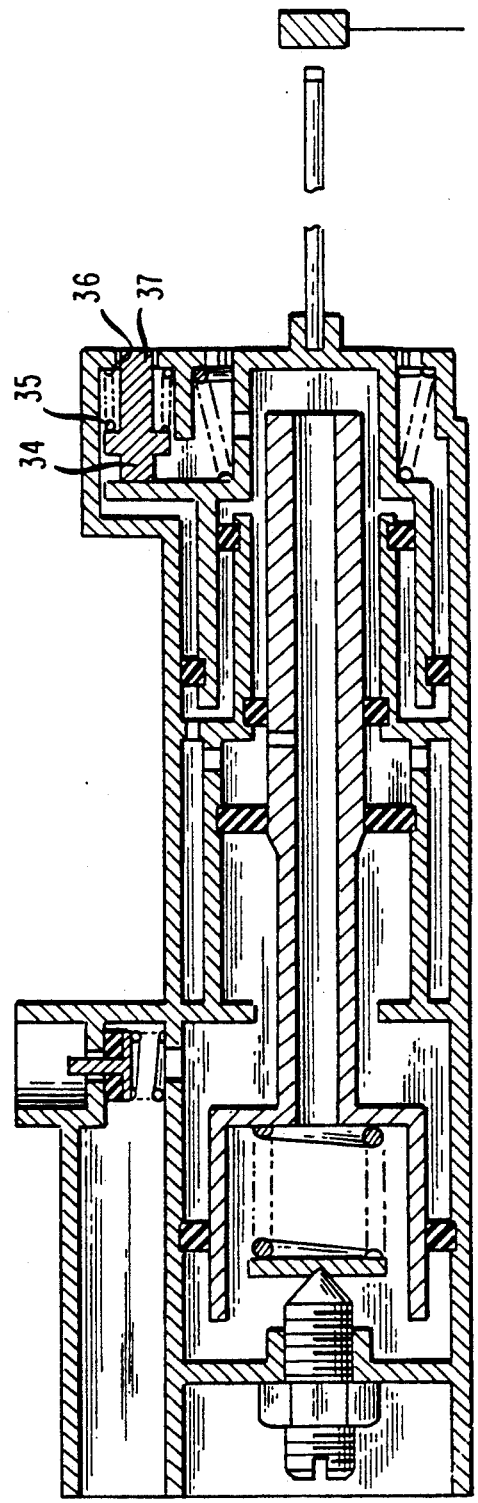
FIG. 2 illustrates a second embodiment of the device similar to the structure illustrated in FIG. 1, including an additional signal generating device.

FIG. 2 illustrates a signal-generating device 34, 35, 36, disposed in a part of the casing of the otherwise identical valve casing 1 of FIG. 1.

The signal-generating device 34, 35, 36, is formed by an actuating member 34, a restoring spring 35, and a breakthrough casing opening 36. Depending on the regulating distance s generatable with the actuator 13 or with the auxiliary actuator 3, 24, 26, the actuating member 34 can be actuated against the force of the restoring spring 35. For example, an optically-perceivable signal can be generated by the signal-generating device 34, 35, 36 for the duration of the generated regulating distance s. For example, a pin-shaped signal-generating part 37 of the actuating member 34 penetrates the breakthrough casing opening 36. According to a preferred embodiment, the pin-shaped signal-generating part 37 of the actuating member 34 can be optically emphasized based on a corresponding coloration. A view display window can be present in the casing instead of the breakthrough casing opening 36. The view display window serves for the generation of an optically perceivable signal based on covering the display with the pin-shaped signal-generating part 37.

The mode of operation of this device is as follows:

If a tire pressure, which is equal to or higher than the specified set tire pressure, is applied to the pressure inlet port 2 and to the measurement chamber 21, then the auxiliary actuator 3, 24, 26, is disposed in a switching position, in which the inlet valve 3, 4, is closed as shown in FIG. 1. In this operating state, the pressure chambers 8, 9, 10, are vented into the atmosphere via a passage port, the chamber 38, and the passage port 39, and the outlet port 12. The actuator 13 is not subjected to pressure and is retained by the restoring spring 18 in a non-indicating initial position. The sensor 23 then receives no signal and the signal-generating device 34, 35, 36, according to FIG. 2, does not generate an optically perceivable signal.

When the tire pressure drops below the specified set tire pressure, then the force of the pressure measurement member 28 prevails. The auxiliary actuator 3, 24, 26, is thereby moved into a switching position, wherein the inlet valve 3, 4, is opened based on formation of an annular slot between the valve seal 4 and the smaller diameter 7 of the valve body 3. The pressure chamber 8, 9, 10, are then no longer connected to the atmosphere because the passage port 11 has passed the seal 5 in the closing direction.

The pressure inlet port 2, the measurement chamber 21, and the pressure chambers 8, 9, 10 are connected to each other via the inlet valve 3, 4 in this operating state. The actuator 13 is then subjected to the tire pressure and is brought with the passage of the regulating distance s passing over into the signal position. While in said signal position, the sensor 23 receives a signal based on the approach of the component 20. According to FIG. 2, the actuating member 34 of the signal-generating device 34, 35, 36 is brought into a display position by the actuator 13.

Based on a defective tire or on a disturbed or faulty connection of the pressure inlet port 2 to the tire, a pressure balancing, caused and induced via the inlet valve 3, 4, can cause the pressure, present in the pressure chamber 10 for actuating the actuator 13, to drop to such an extent that the actuator 13, upon a prevailing of the force of the restoring spring 18, tends to move back into the non-displaying position. However, based on such a pressure drop, and based on the prevailing value of the force of the pressure measurement member 28 acting in actuation direction onto the auxiliary actuator 3, 24, 26, the auxiliary actuator 3, 24, 26 is moved in a direction towards the actuator 13. After the auxiliary actuator 3, 24, 26 makes contact with the actuator 13, there is furthermore generated the regulating distance s with the force of the pressure measurement member 28 or, respectively, is mechanically transferred to the transfer mechanism 19. In case of a non-single piece connection of the actuator 13 and the transfer mechanism 19, the actuator 13 would not return to its non-indicating initial position, based on a drop and a disappearance of the actuating pressure directed onto the actuator 13, while the auxiliary actuator 3, 24, 26, is in a position to further maintain the display furnished by the regulating distance s based on contact with the transfer mechanism 19.

When the electrical or, respectively, electronic part of the tire pressure monitoring device is switched off or when the vehicle is stopped, the sensor 23 can in fact no longer transfer any information. However, the optically-perceivable display of the signal-generating device 34, 35, 36, remains intact in the proximity of the tire.

Upon refilling of the tire, i.e. upon reaching the specified set tire pressure at the pressure inlet port 2, the first actuator 13, and with the actuator 13 also the actuating member 34, is returned into the non-displaying initial position by way of venting of the pressure chambers 8, 9, 10. The reaching of the specified set tire pressure as well as the operational functioning of the valve casing 1 is recognizable therefrom.

The auxiliary actuator 3, 24, 26 can be formed such that the piston-shaped extension 24 joins the smaller outer diameter annular section 7 and a larger-outer diameter annular section 6 formed at the end of the actuator 13. The actuator 13 can be disposed in a direction toward the pressure measurement member formed as a compression spring 28. The valve casing 1 can comprise an intermediate annular wall 40 disposed between the larger-diameter section 42 of the actuator 13 and the extension section 26 of the auxiliary actuator 3, 24, 26. The intermediate annular wall 40 can be furnished outside, at its end in the direction of the linkage 19 on its larger diameter, with an outer seal 17 for contacting the actuator 13. The intermediate annular wall 40 can be furnished at its end toward the compression spring with an annular second seal 5 forming an outlet valve 3, 5.

The pressure measurement member can be a compression spring 28. A support seat 46 for a first end of the restoring force spring 18 can be furnished by a step between the smaller-diameter annular section 44 and the larger-diameter annular section 42 of the actuator 13. A second end of the restoring force spring 18 can contact an internal edge of the valve casing 1. An adjusting screw 29 can be mounted to the valve casing 1 for adjusting the tension of the compression spring 28. An engagement 48 plate can contact an end of the compression spring 28 remote relative to the actuator position and can be disposed to be actuated by the adjusting screw 29. A first sealing ring 16 can be furnished at the larger-diameter annular section 42 of the actuator 13 near the end of the actuator 13 towards the compression spring 28 on the soutside with the larger-diameter annular section 42 for contacting an inner wall of the valve casing 1. A second sealing ring 25 can be furnished to the valve casing 1 for contacting an outside of the piston-shaped extension 24 for sealing the pressure measurement chamber 21. A filling port 33 can be attached to the valve casing 1 for a connection to a pressure supply for pressurizing a tire. A check valve 30, 31, 32 can be disposed at the filling port 33 for preventing an outflow of pressurized air from the tire upon a disconnection of the pressure supply. A pressure inlet port 2 can be attached to the valve casing 1 for connecting the valve casing 1 to a tire. A breakthrough opening 22 can connect the pressure inlet port 2 to the pressure measurement chamber 21.

It will be understood that each of the elements described above, or two or more together, may also find a useful application in other types of monitoring devices differing from the types described above. While the invention has been illustrated and described as embodied in the context of a device for monitoring the pressure of a measurement chamber charged with the pressure of a vehicle tire, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for monitoring the pressure of a measurement chamber subjected to the pressure of a vehicle tire comprising
   an actuator for generating a signal indicating a pressure drop in a measurement chamber, wherein the actuator is actuated against a force of a first spring based on the pressure in the measurement chamber;
   a valve device, within the measurement chamber engaging the actuator and controlled dependent on the pressure in the measurement chamber, wherein the actuator is connected to the measurement chamber in case of a pressure drop through actuation of the valve device;
   a second spring engaging the valve device for control and actuation of said valve device and thereby subjected to the pressure in the measurement chamber; the improvement comprising
   the second spring engaging with the valve device such that the second spring moves the valve device to engagement.

2. The device according to claim 1, further comprising a transfer mechanism for transferring a signal corresponding to said engagement of the valve device onto a sensor scanning operation of the valve device.

3. The device according to claim 2, wherein the transfer mechanism is formed by a bendable linkage of the kind of a Bowden cable.

4. The device according to claim 2, wherein the actuator is formed together with the transfer mechanism as a single piece, and wherein a path distance generatable with the valve device, is mechanically transferable onto the actuator.

5. The device according to claim 4, wherein the mechanical transfer of the path distance from the, valve device onto the transfer mechanism is performed after the valve device makes contact with the actuator.

6. The device according to claim 1, wherein
   the valve device includes a section constructed for serving as a valve body for the valve device;
   the section forms together with a seal an inlet valve, wherein the actuator is connectable with the measurement chamber through the inlet valve for a pressure application;
   the section forms together with a seal an outlet valve, wherein the actuator is connectable with an atmospheric outlet port through the outlet valve, for purposes of pressure venting and pressure release.

7. The device according to claim 6, wherein the force of a pressure measurement member serves for an actuation of the valve device such that the inlet valve opens and the outlet valve closes in case of a pressure in the measurement chamber having a level value below a specified pressure.

8. The device according to claim 1, wherein
   a signal-generating device is furnished with an actuating member, wherein the signal-generating device can be actuated depending on the path distance, generatable by the actuator or by the valve device, against a force of the second spring;
   for example an optically perceivable signal can be generated with the signal generating device for the time duration of the generated path distance.

9. The device according to claim 8, wherein the signal-generating device is integrated into a casing surrounding the pressure-sensitive device.

10. The device according to claim 9, wherein
    a signal-generating part of the actuating member is formed of a signal pin penetrating a breakthrough casing opening.

11. The device according to claim 10, wherein
    the signal-generating part of the actuating member is optically emphasized by a specific coloration.

12. The device according to claim 11, wherein
    the optically perceivable signal is generated by a complete or partial covering of a view window coordinated to the signal-generating device.

13. A device for monitoring the pressure of a measurement chamber subjected to the pressure of a vehicle tire comprising
    a cylindrical valve body forming a valve device and controllable dependent on the pressure in the pressure measurement chamber;
    a piston-shaped extension having a piston face and coaxially attached to a first axial end of the valve body, wherein the piston-shaped extension is set in motion in case of a pressure drop in the pressure measurement chamber for actuation of the valve device;
    a transducing extension forming a second axial end of the valve body, wherein the cylindrical valve body, the piston-shaped extension, and the transducing extension together form an auxiliary actuator;
    a pressure measurement member, disposed and structured such that the pressure measurement member engages the piston-shaped extension of the auxiliary actuator for an auxiliary generation of a regulating distance and for controlling and actuating the valve device;

a pressure measurement chamber defined by a volume space adjoining a middle section of an outside surface of the valve body, adjoining the piston face of the piston-shaped extension, and disposed such as to subject the piston-shaped extension to the pressure in the measurement chamber;

a transducing member engaged by the transducing extension, whereby the pressure measurement member acts, in case of a pressure drop, mechanically onto the piston-shaped extension;

a restoring force member engaging the transducer member;

an actuator associated with the transducing member for generating a regulating distance indicating a pressure drop in the measurement chamber, wherein the actuator is actuated by a pressure of the measurement chamber against a force of the restoring force member.

14. The device according to claim 13, wherein the transducing member is furnished by an actuator pressed by a restoring force of a spring furnishing the restoring force member.

15. The device according to claim 13, wherein the transducing member is furnished by a transfer mechanism actuated by the actuator;

wherein the transfer mechanism is furnished for transferring a control setting distance onto a sensor scanning the control setting distance;

wherein the transfer mechanism is formed by an elastic linkage of the kind of a Bowden cable.

16. The device according to claim 13, wherein the transducing member is furnished by a transfer mechanism actuated by an actuator;

wherein the actuator is formed together with the transfer mechanism as a single piece; and wherein a regulating distance generated with the auxiliary actuator is mechanically transferred onto the actuator;

wherein the mechanical transfer of the regulating distance is performed from the auxiliary actuator onto the transfer mechanism after the auxiliary actuator makes contact with the actuator.

17. The device according to claim 13, further comprising a valve casing;

a first seal disposed at the valve casing for engaging the valve body, wherein the auxiliary actuator includes a first section, wherein the first section is constructed such that it serves as the valve body for the valve device and wherein the valve body with its first section engages the first seal;

a second seal disposed at the valve casing, wherein the first section forms together with the second seal an outlet valve, wherein the actuator is connectable to an atmospheric outlet port via the outlet valve for purposes of pressure venting and pressure release;

wherein the transducing member is formed by an actuator connectable to the inlet valve for providing a pressure application to the piston-shaped extension;

wherein the force of the pressure measurement member serves for an actuation of the valve device such that the inlet valve opens and the outlet valve closes in case of a pressure in the measurement chamber having a level value below a specified pressure.

18. The device according to claim 13, further comprising a signal-generating device furnished with an actuating member, wherein the signal-generating device is actuated depending on a regulating distance furnished by the actuator or furnished by the auxiliary actuator;

a second restoring force member for providing a restoring force against motion of the actuator upon a pressure drop, wherein the signal generating device generates an optically perceivable signal for a time duration corresponding to the generated regulating distance, wherein the signal-generating device is integrated into a valve casing surrounding the pressure-sensitive device;

a signal-generating part attached to the actuating member formed by a signal pin for penetrating a breakthrough valve casing opening, wherein the signal-generating part of the actuating member is optically emphasized by a specific coloration, and wherein the optically perceivable signal is generated by a complete or partial covering of a view window coordinated to the signal-generating device.

19. The device according to claim 13, further comprising a valve casing, wherein the auxiliary actuator is formed such that the piston-shaped extension joins a smaller outer diameter annular section and a larger outer diameter annular section, formed at the end of the actuator, which actuator is disposed in a direction toward the pressure measurement member formed as a compression spring;

wherein the valve casing comprises an intermediate annular wall disposed between the larger outer diameter section of the actuator and the extension section of the auxiliary actuator, and wherein the intermediate annular wall is furnished outside, at its end in the direction of the linkage on its larger diameter, with an outer seal for contacting the actuator, and wherein the intermediate annular wall is furnished at its end toward the compression spring with an annular second seal forming an outlet valve.

20. The device according to claim 13, further comprising a restoring-force spring;

wherein the pressure measurement member is a compression spring;

a support seat for a first end of the restoring force spring furnished by a step between the smaller outer diameter annular section and the larger outer diameter annular section of the actuator, and wherein a second end of the restoring force spring contacts an internal edge of the valve casing;

an adjusting screw mounted to the valve casing for adjusting the tension of the compression spring;

an engagement plate contacting an end of the compression spring remote relative to the actuator position and disposed to be actuated by the adjusting screw;

a first sealing ring furnished at the larger outer diameter annular section of the actuator near the end of the actuator towards the compression spring on the outside with the larger outer diameter annular section for contacting an inner wall of the valve casing;

a second sealing ring furnished to the valve casing for contacting an outside of the piston-shaped extension for sealing the pressure measurement chamber;

a filling port attached to the valve casing for connecting to a pressure supply for pressurizing a tire;

a check valve disposed at the filling port for preventing an outflow of pressurized air from the tire upon a disconnection of the pressure supply;

a pressure inlet port attached to the valve casing for connecting the valve casing to a tire;

a breakthrough opening connecting the pressure inlet port to the pressure measurement chamber.

21. A device for monitoring the pressure of a measurement chamber subjected to the pressure of a vehicle tire comprising an actuator for generating a signal indicating a pressure drop in a measurement chamber, wherein the actuator is actuated against a restoring force of a first spring based on the pressure in the measurement chamber;

a valve device disposed within the measurement chamber and controlled dependent on the pressure in the measurement chamber, wherein the actuator is connected to the measurement chamber in case of a pressure drop through actuation of the valve device;

a second spring engaging the valve device for control and actuation of said valve device and thereby subjected to the pressure in the measurement chamber;

the improvement comprising an auxiliary actuator including a section, serving also as a valve body of the valve device, a piston-shaped extension, and an extension piece, wherein the second spring is disposed and structured to act on the piston-shaped extension of the auxiliary actuator, wherein the auxiliary actuator serves for an auxiliary generation of a path distance and, in case of a pressure drop, acts mechanically onto the actuator against the restoring force of the first spring or in the same direction onto a transfer mechanism actuable by the actuator.

22. The device according to claim 21, wherein a transfer mechanism is furnished for transferring the path distance onto a sensor scanning the path distance.

23. The device according to claim 22, wherein the transfer mechanism is formed by a bendable linkage of the kind of a Bowden cable.

24. The device according to claim 22, wherein the actuator is formed together with the transfer mechanism as a single piece, and wherein the path distance, generatable with the auxiliary actuator, is mechanically transferable onto the actuator.

25. The device according to claim 24, wherein the mechanical transfer of the path distance from the auxiliary actuator onto the transfer mechanism is performed after the auxiliary actuator makes contact with the actuator.

26. The device according to claim 21, wherein the valve device is formed by the section of the auxiliary actuator, serving as the valve body for the valve device, and forming together with a first seal an inlet valve, wherein the actuator is connectable with the measurement chamber with the inlet valve for a pressure application, and by the section of the auxiliary actuator, serving as the valve body for the valve device, and forming together with a second seal an outlet valve, wherein the actuator is connectable with an atmospheric outlet port via the outlet valve, for purposes of pressure venting and pressure release.

27. The device according to claim 26, wherein the force of the second spring serves for an actuator of the valve device such that the inlet valve opens and the outlet valve closes in case of a pressure in the measurement chamber having a level value below a specified pressure.

28. The device according to claim 21, wherein a signal-generating device includes an actuating member, a restoring spring, and a breakthrough casing opening, wherein the signal-generating device can be actuated depending on the path distance, generatable by one of the actuator and the auxiliary actuator, against a force of the restoring spring;

for example an optically perceivable signal can be generated with the signal generating device for the time duration of the generated path distance.

29. The device according to claim 28, wherein the signal-generating device is integrated into a casing surrounding the pressure-sensitive device.

30. The device according to claim 29, wherein a signal-generating part of the actuating member is formed of a signal pin penetrating the breakthrough casing opening.

31. The device according to claim 30, wherein the signal-generating part of the actuating member is optically emphasized by a specific coloration.

32. The device according to claim 31, wherein the optically perceivable signal is generated by a complete or partial covering of a view window coordinated to the signal-generating device.

* * * * *